(12) United States Patent
Oz et al.

(10) Patent No.: US 12,474,469 B2
(45) Date of Patent: Nov. 18, 2025

(54) RADAR ABSORBING STRUCTURE

(71) Applicant: TUSAS—TURK HAVACILIK VE UZAY SANAYII ANONIM SIRKETI, Ankara (AR)

(72) Inventors: Yahya Oz, Ankara (AR); Zeynep Ergonenc Yavas, Ankara (AR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 395 days.

(21) Appl. No.: 18/010,966

(22) PCT Filed: Mar. 30, 2021

(86) PCT No.: PCT/TR2021/050282
§ 371 (c)(1),
(2) Date: Dec. 16, 2022

(87) PCT Pub. No.: WO2021/257023
PCT Pub. Date: Dec. 23, 2021

(65) Prior Publication Data
US 2023/0228871 A1 Jul. 20, 2023

(51) Int. Cl.
*G01S 13/933* (2020.01)
*H01Q 17/00* (2006.01)

(52) U.S. Cl.
CPC ......... *G01S 13/933* (2020.01); *H01Q 17/005* (2013.01); *H01Q 17/008* (2013.01)

(58) Field of Classification Search
CPC .. G01S 13/933; H01Q 17/005; H01Q 17/002; H01Q 17/00–008; D06M 11/83; D06M 10/06; D06M 11/74; D06M 23/06; D06M 23/08; D06M 2200/00; B82Y 30/00; B82Y 20/00; C08K 3/00–40; C01B 32/15–198; B32B 5/00–32; B32B 7/00–14
USPC .......... 342/1–4; 343/705–708; 428/323–328, 428/408; 442/59, 65, 181–226
See application file for complete search history.

(56) References Cited

U.S. PATENT DOCUMENTS

2007/0296032 A1 * 12/2007 Stumbo ................ H10D 62/118
257/E29.151
2018/0127599 A1  5/2018 Wentz
2018/0370197 A1 * 12/2018 Nagamune ............... C09D 7/61

FOREIGN PATENT DOCUMENTS

CN       103866556       6/2014
KR    1020040012224      2/2004

OTHER PUBLICATIONS

International Search Report and Written Opinion for PCT application No. PCT/TR2021/050282, mailed Aug. 31, 2021.
International Preliminary Report on Patentability, completed May 11, 2022.
International Application Status Report received Apr. 21, 2021.

* cited by examiner

*Primary Examiner* — Vladimir Magloire
*Assistant Examiner* — Remash R Guyah
(74) *Attorney, Agent, or Firm* — Notaro, Michalos & Zaccaria P.C.

(57) ABSTRACT

A radar-absorbing structure is disclosed which includes a fiber, at least one binding agent disposed on the fiber and thus enabling the fiber to bind to another fiber.

11 Claims, 2 Drawing Sheets

RADAR ABSORBING STRUCTURE

Figure 1:
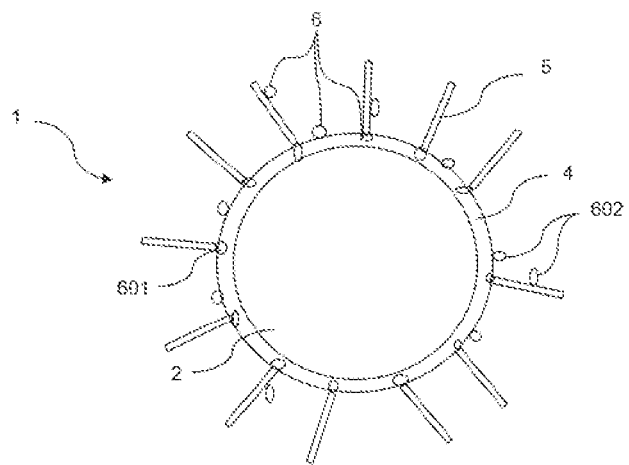

This invention relates to a radar-absorbing structure enabling the absorption of radio waves.

Radar absorbing structures/materials are structures that reflect an incident electromagnetic wave within operating frequencies at the least possible rate, thereby converting a large part of the electromagnetic energy into heat and dampening it. Radar absorbing materials (RAM) absorb and reduce the electromagnetic energy reflected by the radar and thus enable the reduction of the radar cross section. The operation of the radar absorbing material is based on impedance matching or attenuation of an incident electromagnetic wave by utilizing the properties of magnetic and dielectric materials. Radar absorbing materials can be used on-air, land, and sea platforms where a low radar cross-section is of critical importance. Thanks to the use of radar-absorbing materials on these platforms, radio waves reaching the platform surface are highly absorbed and the target detection ranges of radar systems can be greatly reduced. There are 4 basic techniques to reduce the radar cross-section value in air and/or space and/or marine vehicles; shaping, radar absorbing materials, passive and active cancellation. Among these techniques, shaping and radar absorbing materials are the most efficient techniques.

The People's Republic of China patent application document CN105647333, which forms part of the state of the art, describes a method of preparing a radar protective coating consisting of a rare earth transition intermetallic compound/ferrite composite. Said system involves steps of producing a radar absorbing coating and comprises a method of producing a radar absorbing coating composed of a rare earth transition intermetallic compound.

By virtue of a radar absorbing structure developed by the present invention, it is possible to produce a durable structure with very low maintenance costs without the need to replace the material frequently as the number of flights increases.

A further object of this invention is to create a mechanically more durable material due to the geometric advantage of the material used, but also to develop a structure that can absorb radio waves more efficiently as a conductivity-adjustable structure is formed due to this advantage.

A further object of this invention is to develop a more reliable, efficient, low-cost radar absorbing structure.

The radar-absorbent structure realized to achieve the object of the invention, as defined in the first claim and in the claims dependent on this claim, comprises a fiber, at least one binding agent that enables the fiber to adhere to another fiber to form structural integrity among themselves.

The radar absorbing structure according to the invention includes at least one barrier coating disposed of so as to cover the fiber surface to reduce wearing by increasing the fiber strength, at least one rod on the barrier coating in the form of graphene and/or graphene-based nanoribbons, which is conductive and when exposed to the influence of radio waves, enables the minimization of the value of the radar cross section by directing the radio waves, at least one particle provided on the binding agent to enable the binding of rods onto the fiber by allowing the rods on the fiber surface to adhere better to the surface and thus enhances the fiber strength and extends the service life thereof, a fiber which allows the absorption of the radio waves arriving at air and/or space and/or marine vehicle by means of the rod.

An embodiment of the invention comprises a rod that is disposed on the barrier coating angularly in a direction predetermined by the user according to the direction of incident radio waves and which has anisotropic electrical conductivity. Thus the radar absorbing structure is formed with anisotropic conductivity.

An embodiment of the invention comprises a layer, which is formed by the combination of fibers and the binding agent, which has a radar absorbing material property and enables the absorption of radio waves arriving at the air and/or space and/or marine vehicle.

An embodiment of the invention comprises at least one layer composed of glass fiber composite material.

An embodiment of the invention comprises at least one layer composed of carbon fiber composite material.

An embodiment of the invention comprises at least one part formed by assembling the layers An embodiment of the invention comprises a fiber positioned and/or disposed of so as to be on the incident angle direction of the radio waves arriving at the part from the radio wave source and/or from another source.

An embodiment of the invention comprises an aircraft body formed by assembling the parts An embodiment of the invention comprises a layer produced from glass fiber reinforced fibers positioned closest to the outer surface of the aircraft body, which is more exposed to radio waves, and a layer produced from carbon fiber reinforced fibers positioned farthest from the outer surface of the aircraft body.

An embodiment of the invention comprises rods, wherein the density and/or length of the rods closer to the outer surface of the aircraft that is in contact with the air is/are less than the density and/or length of the rods farther from the outer surface of the aircraft body and wherein the density and/or length of the rods gradually increase(s) as it is moved away from the outer surface of the aircraft.

An embodiment of the invention comprises rods coated on the barrier coating using a chemical vapor deposition (CVD) and/or spraying method.

An embodiment of the invention comprises particles made from transition metals.

An embodiment of the invention comprises particles made from iron-based nanoparticles.

An embodiment of the invention comprises a part used in air and/or space and/or marine vehicles.

The radar absorbing structure realized to achieve the object of the present invention is shown in the attached figures, wherein among these figures;

FIG. 1—is a schematic view of a radar absorbing structure.

Figure 2:
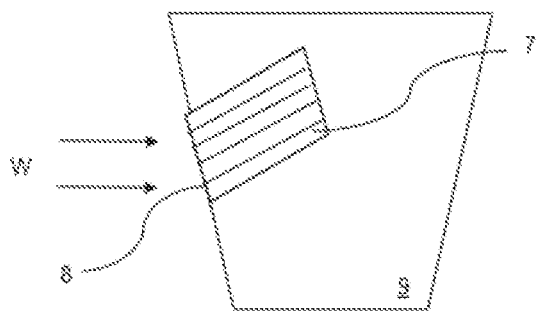

FIG. 2—is a schematic view of an aircraft body.

Figure 3:
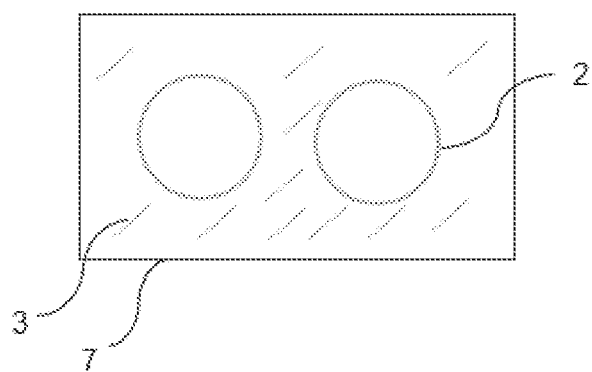

FIG. 3—is a cross-sectional view of a layer.

The parts in the figures are individually numbered and the equivalents of these numbers are given below.

1. Radar absorbing structure
2. Fiber
3. Binding agent
4. Barrier coating
5. Rod
6. Particle
    601. Transition metal particle
    602. Iron-based particle
7. Layer
8. Part
9. Aircraft body
   (W) Radio waves The radar absorbing structure (1) comprises a fiber (2), at least one binding agent (3) disposed on the fiber (2), enabling the fiber (2) to bind to another fiber (2). (FIG. 1 and FIG. 3)

The radar absorbing structure (1) according to the invention comprises at least one barrier coating (4) disposed to cover the surface of the fiber (2), at least one rod (5) which is graphene and/or graphene-based nanoribbons, disposed on the barrier coating (4), at least one particle (6) disposed on the binding agent (3) to allow the rods (5) to adhere to the fiber (2), and a fiber (2) which enables radar absorption by means of the rod (5). (FIG. 3)

The fibers (2) used here are employed in the construction of air and/or space and/or marine vehicles. The binding agent (3) enables the adhesion of fibers (2) to each other. Thus, the fibers (2) form structural integrity.

The radar absorbing structure (1), commonly used in air and/or space and/or marine vehicles, allows reducing the radar cross section value formed under the influence of radio waves (W) in vehicles by absorbing the radio waves (W) acting on air and/or space and/or marine vehicles. In order to increase the strength of the fiber (2), the barrier coating (4) is used. Thus, it enables an increase in the material life. However, the barrier coating (4) ensures that the air and/or space and/or marine vehicle is protected from the heat it is exposed to and minimizes the wear problem as the number of flights of the air and/or space and/or marine vehicle increases. The rod (5), which is electrically conductive graphene and/or graphene based nanoparticle material disposed on the barrier coating (4), directs the current obtained from the radio waves (W) arriving at the air and/or space and/or marine vehicle. In this way, the effect of radio waves (W) is reduced by creating electrical conductivity in certain directions. The particles (6) provide better adhesion of the rod (5) to the fibers (2), wherein the rod (5) is graphene and/or graphene based nanoparticle material, and are disposed on the binding agent (3), prevent the fiber (2) from becoming worn and/or replaced after a certain number of flights.

In an embodiment of the invention, the radar absorbing structure (1) comprises a rod (5) disposed on the barrier coating (4) in a direction predetermined by the user. The rod (5), which has an anisotropic structure and enables the redirection of radio waves (W) by forming an electrical network, is disposed of on the barrier coating (4) in an angular manner. The rods (5), which are from graphene and/or graphene based nanoparticle material, are disposed of on the barrier coating (4) in an angular manner so that they almost completely in contact the rods (5) provided in other fibers. In this way, the radio waves (W) are directed in the desired direction so that the electrical conductivity is adjusted. Adjusting the electrical conductivity in the desired direction also increases the absorption of radio waves (W). The rod (5) also allows attenuating the effects of lightning strikes.

In an embodiment of the invention, the radar absorbing structure (1) comprises at least one layer (7) composed of fibers (2) and a binding agent (3).

In an embodiment of the invention, the radar absorbing structure (1) comprises a layer (7) produced from glass fiber reinforced fiber (2). The layer (7) produced from glass fiber reinforced fiber (2) has insulating properties and reduces the reflection of radio waves (W) when exposed to radio waves (W). Since layer (7) has insulating properties, the electrical conductivity decreases in the direction of incident radio waves (W). Thus the electrical conductivity is directed. However, the layer (7) is located in the direction of incident radio waves (W) so that no secondary waves (secondary wave, edge wave, traveling wave, edge diffraction) takes place.

In an embodiment of the invention, the radar absorbing structure (1) comprises a layer (7) produced from carbon fiber reinforced fibers (2). The layer (7) produced from carbon fiber reinforced fibers (2) has conductivity properties and absorbs incident radio waves (W) and converts the energy formed into heat and/or electrical energy. In this way, it is ensured that the radio waves (W) remain in the air and/or space and/or marine vehicle.

In an embodiment of the invention, the radar absorbing structure (1) comprises at least one part (8) composed of layers (7). The part (8) constitutes the radar absorbing structure (1) suitable for use in air and/or space and/or marine vehicles. (FIG. 2)

In an embodiment of the invention, the radar absorbing structure (1) comprises fibers (2) disposed so as to be on the incident direction of radio waves (W) arriving at the part (8). The fibers (2), which are disposed so as to be in the incident direction of radio waves (W) arriving at the air and/or space and/or marine vehicle, ensures that there is no electrical field generated in this direction.

In an embodiment of the invention, the radar absorbing structure (1) comprises an aircraft body (9) composed of parts (8). (FIG. 2)

In an embodiment of the invention, the radar absorbing structure (1) comprises a layer (7) produced from glass fiber reinforced fibers (2) located closer to the outer surface of the aircraft body (9) than the layer (7) produced from carbon fiber reinforced fibers (2). The layer (7) produced from glass fiber reinforced fibers (2) located closer to the outer surface of the aircraft body (9) reduces the reflection of incident radio waves (W). The layer (7) produced from carbon fiber reinforced fibers (2) converts the radio waves (W) reaching themselves into heat and electrical energy and ensures that the radio waves (W) do not get out to the outer surface of the aircraft body (9).

In an embodiment of the invention, the radar absorbing structure (1) comprises rods (5) gradually increasing in density and/or length from the outer surface of the aircraft body (9) towards the interior of the aircraft body (9). The density and/or length of rods (5) provided on the barrier coating (4) increases relatively as it is moved away from the outer surface of the body (9). Thus, it is ensured that no primary wave and secondary wave are formed on the aircraft body (9). In order to absorb the primary wave, the impedance value of the layer (7) produced from glass fiber reinforced fibers (2) should be equal to the impedance of the air on the outer surface of the aircraft body (9). However, the impedance value of the radio waves (W) should differentiate when they arrive at the interior of the aircraft body (9). The rods (5) provided on the layer (7) produced from glass fiber reinforced fibers (2) in a way that it is less dense and/or length ensures that its impedance value equals the impedance value of the air. At the same time, the rods (5) disposed on the layer (7) produced from carbon fiber reinforced fibers (2) in a denser and/or longer form as compared to the layer (7) produced from glass fibers reinforced fibers (2) provides differentiation in the impedance value.

In an embodiment of the invention, the radar absorbing structure (1) comprises rods (5) coated on the barrier coating (4) by chemical vapor deposition (CVD) and/or spraying method.

In an embodiment of the invention, the radar absorbing structure (1) comprises transition metal particles (601) from transition metals. By virtue of this, the rods (5) adhere better to the barrier coating (4), thereby increasing the strength.

In an embodiment of the invention, the radar absorbing structure (1) comprises iron-based particles (602) in the form of iron-based nanoparticles. By virtue of this, the radar absorbing material property of the radar absorbing structure (1) is increased.

In an embodiment of the invention, the radar absorbing structure (1) comprises parts (8) suitable for use in air and/or space and/or marine vehicles.

The invention claimed is:

1. A radar absorbing structure (1) comprising:
   a plurality of fibers (2), each of the plurality of fibers (2) being a glass fiber reinforced fibers or a carbon fiber reinforced fiber,
   at least one binding agent (3) disposed on each of the plurality of fibers (2), enabling each of the plurality of fibers (2) to bind to another of the plurality of fibers (2),
   at least one barrier coating (4) disposed so as to cover the surface of each of the plurality of fibers (2), wherein at least one rod (5) which is graphene and/or graphene-based nanoribbons is disposed on the barrier coating (4) and at least one particle (6) is disposed on the binding agent (3), so that the at least one rod (5) is adhered to the associated fiber (2), and enabling the at least one rod (5) on each associated fiber (2) to absorb radar,
   at least one layer (7) composed of the plurality of fibers (2) and a binding agent (3), and
   at least one part (8) composed of the at least one layer (7), and wherein the at least one part (8) forms at least a part of an aircraft body (9).

2. The radar absorbing structure (1) according to claim 1, wherein the at least one rod (5) is disposed on the barrier coating (4) in a predetermined direction.

3. The radar absorbing structure (1) according to claim 1, wherein one of the as least one layer (7) is produced from glass fiber reinforced fibers (2).

4. The radar absorbing structure (1) according to claim 1, wherein one of the at least one layer (7) is produced from carbon fiber reinforced fibers.

5. The radar absorbing structure (1) according to claim 1, wherein the plurality of fibers (2) are disposed in the incident direction of radio waves (W) arriving at the least one part (8).

6. The radar absorbing structure (1) as claimed in claim 1, wherein the at least one layer (7) comprises at least two layers (7), wherein one of the at least two layers (7) is produced from glass fiber reinforced fibers (2) and another of the at least two layers (7) is produced from carbon fiber reinforced fibers (2), wherein the layer (7) produced from glass fiber reinforced fibers (2) being disposed closer to an outer surface of the aircraft body (9) than the layer (7) produced from carbon fiber reinforced fibers (2).

7. The radar absorbing structure (1) according to claim 1, wherein each of the plurality of rods (5) gradually increase in density and/or length from an outer surface of the aircraft body (9) towards an interior of the aircraft body (9).

8. The radar absorbing structure (1) according to claim 1, wherein each of the plurality of rods (5) is coated on the barrier coating (4) by chemical vapor deposition (CVD) and/or spray coating method.

9. The radar absorbing structure (1) according to claim 1, comprising transition metal particles (601) from transition metals.

10. The radar absorbing structure (1) according to claim 9, comprising iron-based particles (602) which are iron-based nanoparticles.

11. A part (8) for use in air and/or space and/or marine vehicles formed from the radar absorbing structure (1) of claim 1.

* * * * *